(12) United States Patent
Jang

(10) Patent No.: US 12,364,581 B2
(45) Date of Patent: Jul. 22, 2025

(54) METHOD OF MANUFACTURING IMPLANT STRUCTURE INCLUDING CROWN FLOWING IN RESPONSE TO OCCLUSAL FORCE AND IMPLANT STRUCTURE

(71) Applicant: INNODEN Co., Ltd., Siheung-si (KR)

(72) Inventor: Cheon Seok Jang, Ansan-si (KR)

(73) Assignee: INNODEN Co., Ltd, Siheung-si (KR)

( * ) Notice: Subject to any disclaimer, the term of this patent is extended or adjusted under 35 U.S.C. 154(b) by 0 days.

(21) Appl. No.: 18/280,668

(22) PCT Filed: Feb. 24, 2023

(86) PCT No.: PCT/KR2023/002633
§ 371 (c)(1),
(2) Date: Sep. 6, 2023

(87) PCT Pub. No.: WO2023/182683
PCT Pub. Date: Sep. 28, 2023

(65) Prior Publication Data
US 2025/0025269 A1    Jan. 23, 2025

(30) Foreign Application Priority Data
Mar. 22, 2022   (KR) .................. 10-2022-0035206

(51) Int. Cl.
*B29C 65/00*     (2006.01)
*A61C 8/00*      (2006.01)
(Continued)

(52) U.S. Cl.
CPC ........ *A61C 13/0006* (2013.01); *A61C 8/0068* (2013.01); *B29C 65/483* (2013.01);
(Continued)

(58) Field of Classification Search
CPC ... B29C 65/483; B29C 65/561; B29C 65/564; B29C 65/602; A61C 13/0006; A61C 8/0068
See application file for complete search history.

(56) References Cited

U.S. PATENT DOCUMENTS 8,628,327 B1 *   1/2014   Blaisdell .............. A61C 8/0001
                                                          433/213
2005/0272010 A1  12/2005  Harlan
(Continued)

FOREIGN PATENT DOCUMENTS

KR   10-1924802 B1   12/2018
KR   10-2132353 B1    7/2020
(Continued)

OTHER PUBLICATIONS

International Search Report for PCT/KR2023/002633 mailed May 24, 2023 from Korean Intellectual Property Office.

*Primary Examiner* — Philip C Tucker
*Assistant Examiner* — Nickolas R Harm
(74) *Attorney, Agent, or Firm* — Revolution IP, PLLC

(57) ABSTRACT

The present invention relates to a dental implant structure and a method of manufacturing the same, and more particularly, to a method of manufacturing an implant structure including a crown flowing in response to occlusal force capable of preventing an implant structure such as a fixture or an abutment and/or an abutment screw, which is provided at a lower portion of a crown, from being fractured due to repetitive occlusal force by installing an elastomer absorbing the occlusal force between the crown and the abutment, and an implant structure.

7 Claims, 7 Drawing Sheets

(51) Int. Cl.
 *A61C 13/00* (2006.01)
 *B29C 65/48* (2006.01)
 *B29C 65/56* (2006.01)
 *B29C 65/60* (2006.01)

(52) U.S. Cl.
 CPC ......... *B29C 65/561* (2013.01); *B29C 65/564* (2013.01); *B29C 65/602* (2013.01)

(56) References Cited

U.S. PATENT DOCUMENTS

| | | | |
|---|---|---|---|
| 2011/0262884 A1* | 10/2011 | Zena | A61C 8/0001 433/201.1 |
| 2014/0205969 A1* | 7/2014 | Marlin | A61C 8/0068 433/196 |
| 2016/0262855 A1* | 9/2016 | Ju | A61C 8/0074 |
| 2020/0146786 A1* | 5/2020 | Fromovich | A61C 8/005 |
| 2022/0249208 A1* | 8/2022 | Chenaux | A61C 8/0027 |
| 2023/0200950 A1* | 6/2023 | Kofford | A61C 8/0069 433/173 |

FOREIGN PATENT DOCUMENTS

| | | |
|---|---|---|
| KR | 10-2214900 B1 | 2/2021 |
| KR | 10-2304199 B1 | 9/2021 |
| KR | 10-2304797 B1 | 9/2021 |
| WO | 2009-151614 A2 | 12/2009 |

\* cited by examiner

[Figure 1]
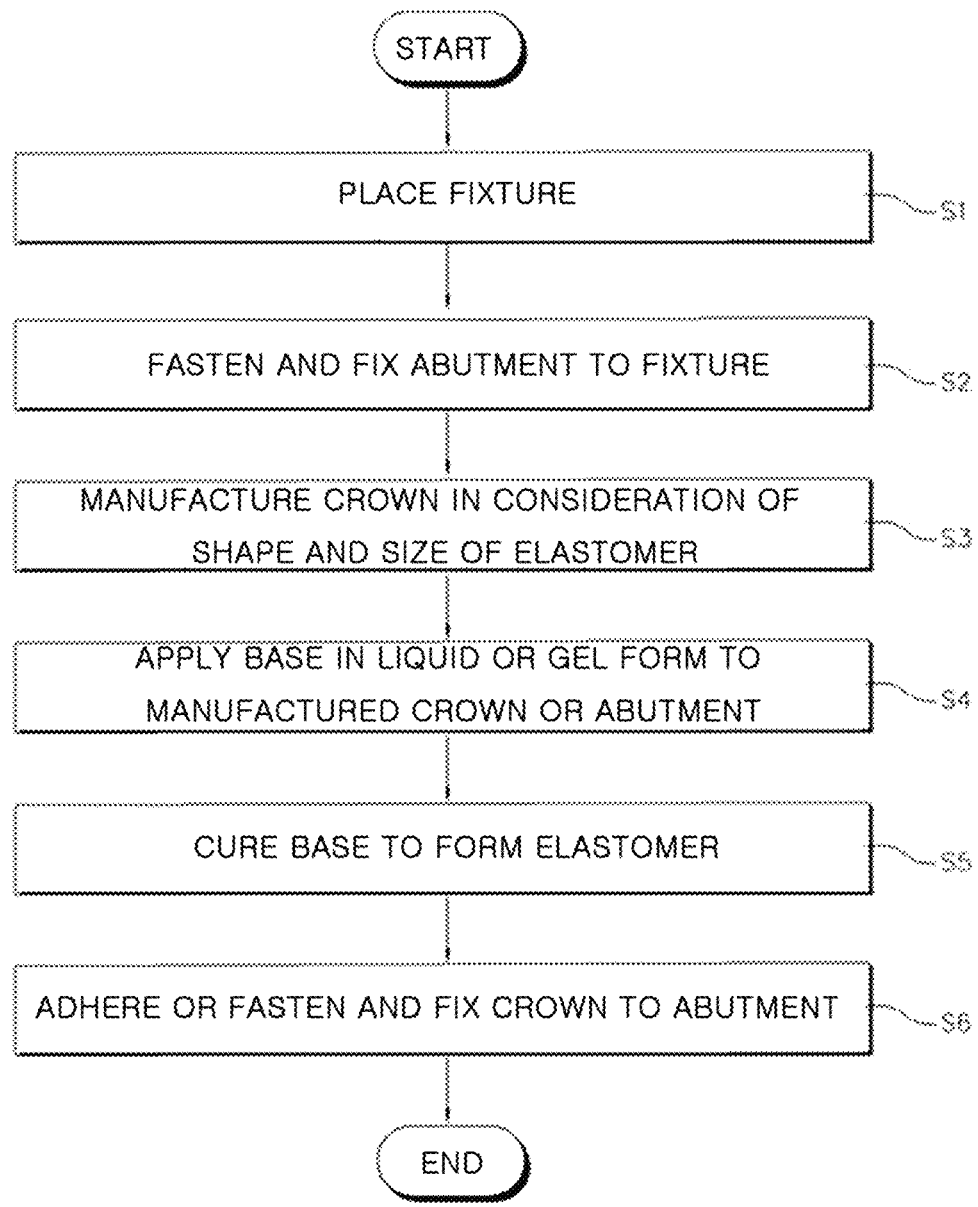

[Figure 2]
FASTEN AND FIX ABUTMENT TO FIXTURE(S2)
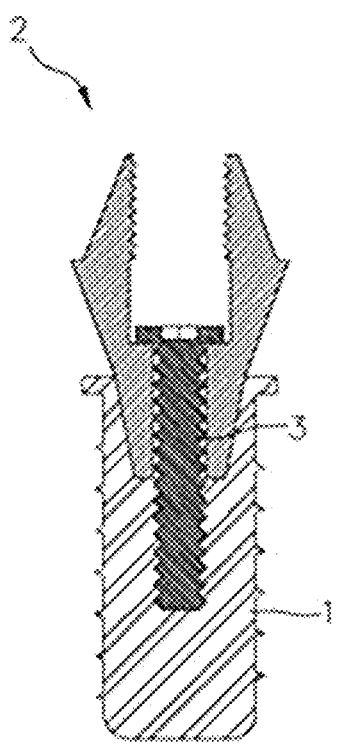

[Figure 3]
MANUFACTURE CROWN (S3)
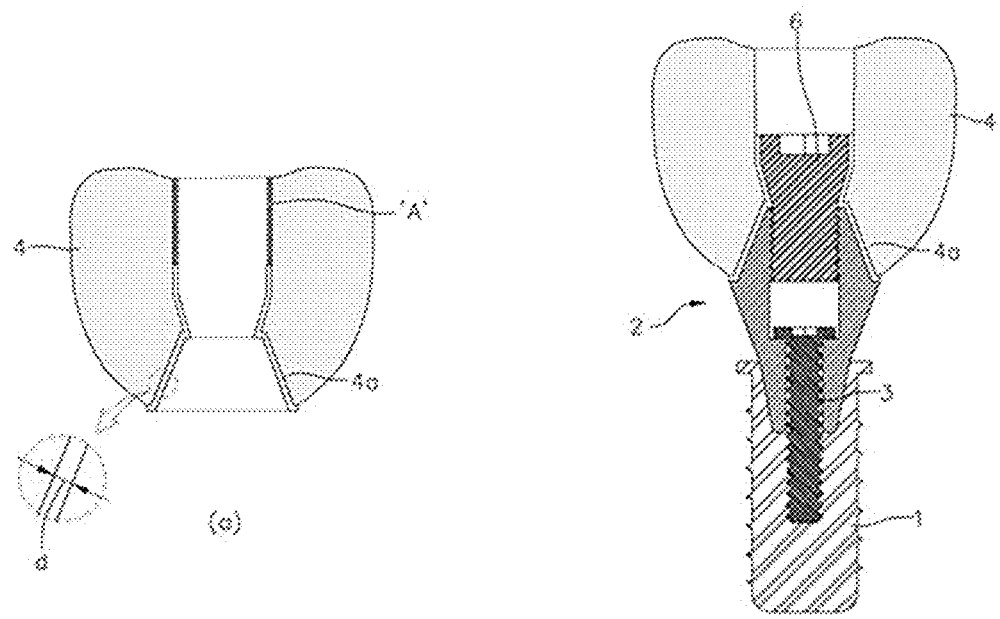

[Figure 4]
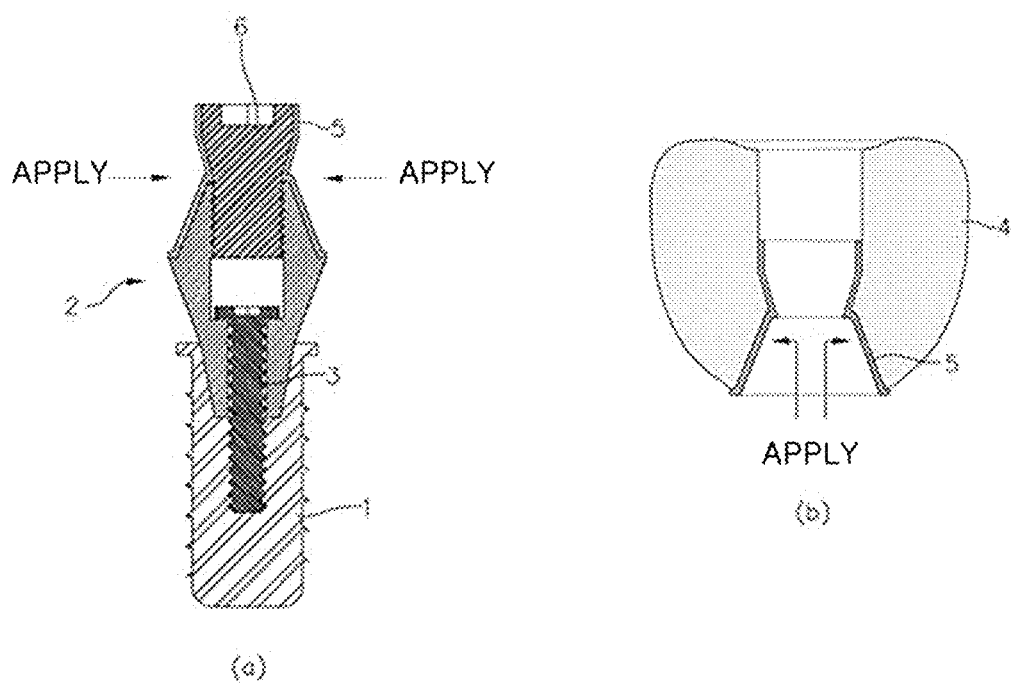

[Figure 5]
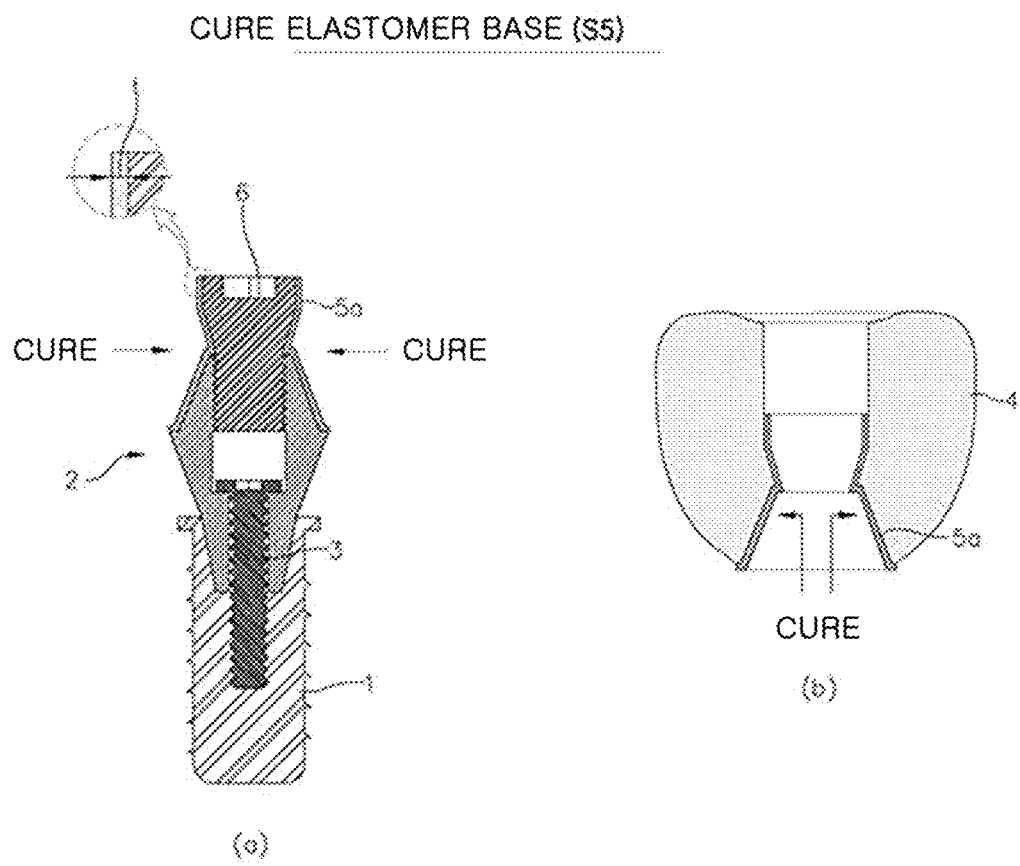

[Figure 6]
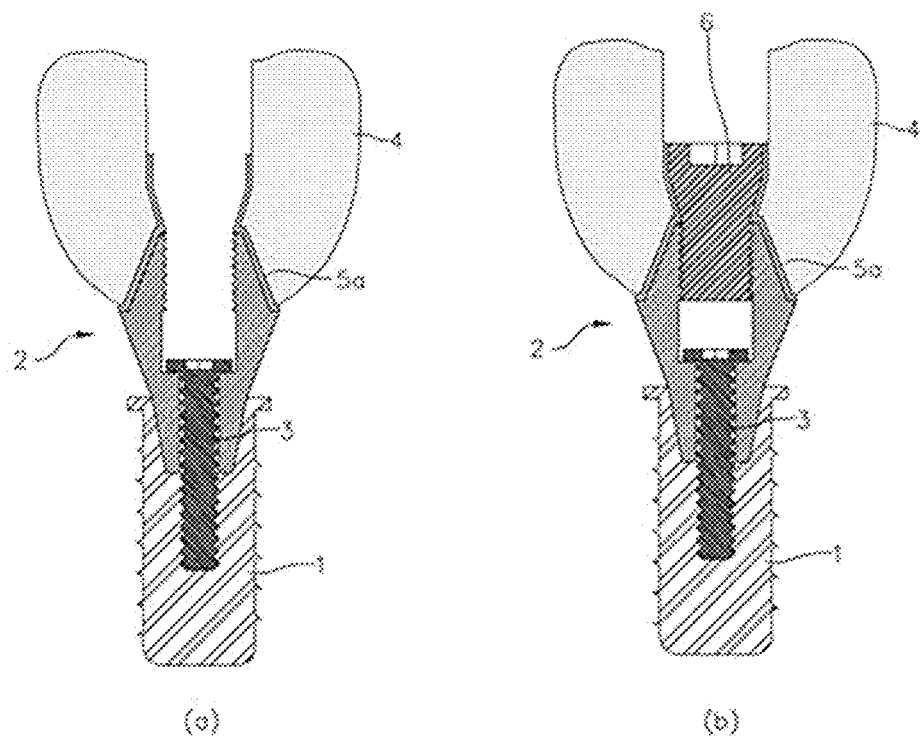

{Figure 7}
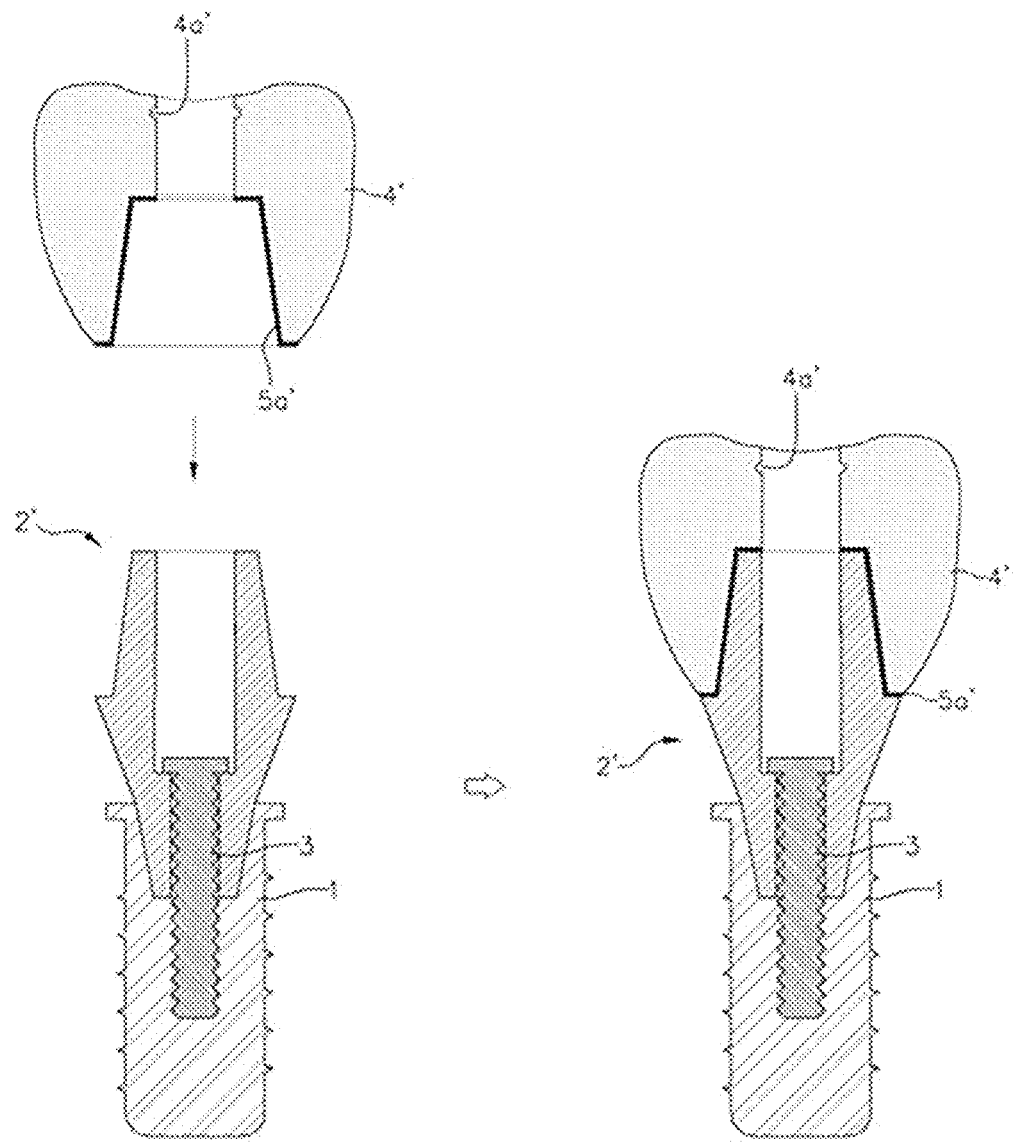

METHOD OF MANUFACTURING IMPLANT STRUCTURE INCLUDING CROWN FLOWING IN RESPONSE TO OCCLUSAL FORCE AND IMPLANT STRUCTURE

TECHNICAL FIELD

The present invention relates to a dental implant structure and a method of manufacturing the same, and more particularly, to a method of manufacturing an implant structure including a crown flowing in response to occlusal force capable of preventing an implant structure such as a fixture or an abutment and/or an abutment screw, which is provided at a lower portion of a crown, from being fractured due to repetitive occlusal force by installing an elastomer absorbing the occlusal force between the crown and the abutment, and an implant structure.

BACKGROUND ART

An implant is basically a fixture that is placed on an alveolar bone, an abutment that is fixed to the fixture and supports lateral or horizontal pressure in response to occlusal force applied during mastication, and a crown (artificial tooth) that restores an aesthetic beauty similar to a natural tooth by covering an upper portion of the abutment.

In general, a crown is manufactured in an optimized shape and size corresponding to a shape and size of the abutment, and then adhered to an upper surface of the abutment using an adhesive or the like. The crown is usually made of a hard material to mash food well during mastication. For example, as a material used for a crown, a dental metal or dental gold is cast and used, or the crown is manufactured by processing a zirconium oxide block through a CAD/CAM operation.

However, in the conventional implant structure, there is no component capable of absorbing the occlusal force like a periodontal ligament of natural teeth. For this reason, when the occlusal force is repeatedly applied to the crown, a problem may occur in that a fixture or an abutment and/or an abutment screw, etc., which are lower structures of the crown, may be repeatedly applied with the occlusal force and thus may be fractured.

RELATED ART DOCUMENTS

Patent Documents (Patent Document 1) KR 10-2304199 B1, 2021. 09. 14.
(Patent Document 2) KR 10-2304797 B1, 2021. 09. 15.
(Patent Document 3) KR 10-2132353 B1, 2020. 07. 03.
(Patent Document 4) KR 10-1924802 B1, 2018. 11. 28.

DISCLOSURE

Technical Problem

Therefore, an object of the present invention provides a method of manufacturing an implant structure capable of preventing an implant structure such as a fixture or an abutment and/or an abutment screw, etc., which are lower structures of a crown, from being fractured due to repetitive occlusal force, and an implant structure.

In addition, another object of the present invention is to provide a method of manufacturing an implant structure capable of easily forming an elastomer that absorbs repetitive occlusal forces, and an implant structure.

In addition, the present invention is not limited to the above-described purpose, and various objects may be additionally provided through technologies described through embodiments and claims to be described later.

Technical Solution

According to an aspect of the present disclosure, a method of manufacturing an implant structure including a crown flowing in response to occlusal force includes: placing a fixture in an alveolar bone; fastening and fixing an abutment to the fixture; manufacturing the crown; applying an elastomer base to an outer surface of the abutment or an inner side surface of the crown; and curing the elastomer base to form the elastomer; and fixing the crown to cover an upper surface of the elastomer.

in the fastening and fixing of the abutment to the fixture, the abutment nay be fastened and fixed to the fixture using a screw integrally formed with the abutment or fastened and fixed to the fixture using an abutment screw separated from the abutment.

In the manufacturing of the crown, the crown may be manufactured so that a space in which the elastomer is accommodated is formed on an inner side surface of the crown.

The space may be formed to have so that a depth is equal to or smaller than a thickness of the elastomer.

An opening through which the upper portion of the abutment is exposed may be formed in the crown, and the opening may be provided with a coupling groove for bonding strength with a resin filled and embedded through a subsequent process.

The elastomer base may be made of a synthetic resin material, a synthetic rubber material, or a silicone material in the liquid or gel form.

In the fixing of the crown to cover the upper surface of the elastomer, the crown may be adhered and fixed to the elastomer using an adhesive, or the abutment may be fastened and fixed to the abutment through the abutment cap screwed to the upper portion.

According to another aspect of the present disclosure, there is provided an implant structure manufactured through the method of manufacturing an implant structure including the crown that flows in response to the occlusal force.

Advantageous Effects

As described above, according to the present invention, an elastomer base in a liquid or gel form is applied to an inner side surface of a crown and a surface of an abutment and then cured to form an elastomer having elasticity between the crown and the abutment, so it is possible to prevent a fixture or an abutment and/or an abutment screw from being fractured due to repetitive occlusal force.

Therefore, according to the present invention, an elastomer absorbs applied occlusal force while flowing in a direction in which the occlusal force is applied, so it is possible to prevent a fixture or an abutment and/or an abutment screw, which are a lower structures of a crown, from being fractured due to occlusal force repetitively applied to the fixture or the abutment and/or the abutment screw.

DESCRIPTION OF DRAWINGS

FIG. 1 is a flowchart of a method of manufacturing an implant structure according to an embodiment of the present invention.

FIGS. 2 to 6 are diagrams for each process illustrated in FIG. 6.

FIG. 7 is a flowchart of a method of manufacturing an implant structure according to another embodiment of the present invention.

MODE FOR INVENTION

Various advantages and features of the present invention and methods accomplishing them will become apparent from the following description of embodiments with reference to the accompanying drawings. Also, like reference numerals designate like elements throughout this specification. In addition, each component illustrated in each figure may be excessively illustrated in size and shape, which is for convenience of description and is not intended to be limited. In addition, when described as "A and/or B," it may mean both A and B, or either A or B.

Hereinafter, embodiments of the present invention will be described in detail with reference to the accompanying drawings.

FIG. 1 is a flowchart illustrating a method of manufacturing an implant structure according to an embodiment of the present invention, and FIGS. 2 to 6 are views schematically illustrating the manufacturing method illustrated in FIG. 1 for each process. Here, for convenience of description, an implant structure of a two-piece structure in which an abutment is fastened and fixed to a fixture through an abutment screw will be described as an example.

Referring to FIG. 1, a fixture 1 is implanted in an alveolar bone (S1).

Subsequently, as illustrated in FIGS. 1 and 2, the abutment 2 is fastened and fixed to the fixture 1 implanted in the alveolar bone (S2). In this case, the abutment 2 is fastened and fixed by the abutment screw 3.

In FIG. 2, the abutment 2 is fastened and fixed to the fixture 1 by the abutment screw 3, which is an example, and in the case of a one-piece structure in which the abutment screw is integrally formed with the abutment, the abutment may be directly fastened and fixed to the fixture.

Then, as illustrated in FIGS. 1 and 3, the crown 4 is manufactured (S3). In this case, considering the shape and size of the elastomer 5a (see FIG. 5) to be formed between the crown 4 and the abutment 2 when the crown 4 is manufactured, a space 4a where the elastomer 5a is formed on an inner side surface of the crown 4 is formed in advance.

In the conventional implant structure in which the elastomer 5a is not installed, an inner area of the crown may extend to the space 4a and a hatched area 'A' as illustrated in FIG. 3A. However, in the embodiment of the present invention, considering the elastomer 5a to be installed between the crown 4 and the abutment 2, the inner area may have an area reduced by the space 4a and the hatched area 'A'.

For example, in the same abutment structure, the space 4a and the hatched area 'A', which are areas reduced compared to the conventional implant structure, may be changed according to the shape and size of the elastomer 5a. When the elastomer 5a having the structure illustrated in FIG. 5 is installed, as illustrated in FIG. 3B, the space 4a has a shape corresponding to the shape of the elastomer 5a. In this case, a depth d of the space 4a may be formed to have a size equal to or slightly smaller than a thickness t of the elastomer 5a.

Subsequently, as illustrated in FIGS. 1 and 4, an elastomer base 5 forming an elastomer is applied to a space 4a formed on a surface (see FIG. 4A) of the abutment 2 or an inner side surface (see FIG. 4B) of the crown 4 (S4). In this case, the elastomer base 5 may be made of a synthetic resin material, a synthetic rubber material, or a silicone material in the form of liquid or gel, and the space 4a is filled by applying toothpaste, a joint filler, or the like to the surface of the abutment 2 or the inner side surface of the crown 4.

For example, when applying the elastomer base 5 to the surface of the abutment 2, as illustrated in FIG. 4A, it is applied while the abutment cap 6 is fastened and fixed to the abutment 2. That is, the elastomer base 5 is applied to a side surface of the abutment cap 6 and the abutment 2.

Meanwhile, the shape and size (upper and lower length) of the elastomer base 5 may vary depending on whether the abutment cap 6 is used. For example, when the crown 4 is attached to the abutment 2 using an adhesive (when the abutment cap 6 is not used), the elastomer base 5 may be applied only to an outer surface of the abutment 2.

Subsequently, as illustrated in FIGS. 1 and 5, the elastomer base 5 applied to the surface of the abutment 2 or the inner side surface of the crown 4 is cured to form the elastomer 5a having elasticity (S5).

Subsequently, as illustrated in FIGS. 1 and 6, the manufactured crown 4 is installed to cover the elastomer 5a (S6). In this case, as illustrated in FIG. 6A, the crown 4 may be attached to the elastomer 5a using an adhesive or the like, and then, as illustrated in FIG. 6B, fastened and fixed using the abutment cap 6. In addition, as illustrated in FIG. 6A, the crown 4 may be seated on the upper portion of the elastomer 5a, and then, as illustrated in FIG. 6B, fastened and fixed using the abutment cap 6.

When the crown 4 is fastened and fixed to the abutment 2 using the abutment cap 6, the elastomer 5a may be formed between the head of the abutment cap 6 and the crown 4 and/or between the head of the abutment cap 6 and the upper portion of the abutment 2. In addition, as illustrated in FIG. 6B, the abutment cap 6 is screwed into a groove formed inside the upper portion of the abutment 2.

FIG. 7 is a diagram illustrating a method of manufacturing an implant structure according to another embodiment of the present invention.

Referring to FIG. 7, in the method of manufacturing an implant structure according to another embodiment of the present invention, a crown 4' is attached and fixed to an abutment 2' without using an abutment cap.

Other components are the same as those of the embodiments illustrated in FIGS. 1 to 6.

An elastomer 5a' is formed by being applied to an inner side surface of the crown 4' and cured. The crown 4' is attached and fixed to an outer surface of the abutment 2' using an adhesive while the elastomer 5a' is attached.

Meanwhile, the opening of the crown 4' is later filled and embedded with a resin to complete an artificial tooth, and a coupling groove 4a' may be formed on the inner side surface for bonding strength with the resin to be filled and embedded. In this case, the coupling groove 4a' may be formed in a band shape along an inner side surface of the crown 4'.

Hereinabove, the technical idea of the present invention has been specifically described in the embodiments, but is not limited to the embodiments and may be embodied in a variety of different forms, and is provided to fully inform those skilled in the art of the scope of the invention to which the present invention belongs, and the present invention is defined by the scope of the claims.

The invention claimed is:

1. A method of manufacturing an implant structure including a crown flowing in response to occlusal force, comprising:
   manufacturing a crown;
   applying an elastomer base to an outer surface of an abutment fastened and fixed to a fixture or an inner side surface of the crown;
   curing the elastomer base to form an elastomer; and
   fixing the crown to the abutment,
   wherein in the fixing of the crown to the abutment, the crown is adhered to and fixed to the outer surface of the abutment using an adhesive, or the crown is fastened and fixed to the abutment through an abutment cap screwed to an upper portion of the abutment.

2. The method of claim 1, wherein in the fastening and fixing of the abutment to the fixture, the abutment is fastened and fixed to the fixture using a screw integrally formed with the abutment or fastened and fixed to the fixture using an abutment screw separated from the abutment.

3. The method of claim 1, wherein in the manufacturing of the crown, the crown is manufactured so that a space in which the elastomer is accommodated is formed on an inner side surface of the crown.

4. The method of claim 3, wherein the space is formed to have so that a depth is equal to or smaller than a thickness of the elastomer.

5. The method of claim 1, wherein an opening through which an upper portion of the abutment is exposed is formed in the crown, and the opening is provided with a coupling groove for bonding strength with a resin filled and embedded through a subsequent process.

6. The method of claim 1, wherein the elastomer base is made of a synthetic resin material, a synthetic rubber material, or a silicone material in the liquid or gel form.

7. An implant structure manufactured through the method of manufacturing an implant structure including the crown that flows in response to the occlusal force of claim 1.

* * * * *